United States Patent
Faul et al.

(10) Patent No.: US 9,728,035 B2
(45) Date of Patent: Aug. 8, 2017

(54) GAMING MACHINE

(71) Applicant: NOVOMATIC AG, Gumpoldskirchen (AT)

(72) Inventors: Thomas Faul, Kaiserslautern (DE); Michael Rudolph Luft, Darmstadt (DE)

(73) Assignee: NOVOMATIC AG, Gumpoldskirchen (AT)

( * ) Notice: Subject to any disclaimer, the term of this patent is extended or adjusted under 35 U.S.C. 154(b) by 160 days.

(21) Appl. No.: 14/418,264

(22) PCT Filed: Jul. 5, 2013

(86) PCT No.: PCT/EP2013/064233
§ 371 (c)(1),
(2) Date: Jan. 29, 2015

(87) PCT Pub. No.: WO2014/019802
PCT Pub. Date: Feb. 6, 2014

(65) Prior Publication Data
US 2015/0187167 A1    Jul. 2, 2015

(30) Foreign Application Priority Data
Aug. 3, 2012   (DE) .................. 10 2012 107 132

(51) Int. Cl.
*G06F 17/00* (2006.01)
*G07F 17/32* (2006.01)
*G06Q 20/00* (2012.01)

(52) U.S. Cl.
CPC ......... *G07F 17/3216* (2013.01); *G06Q 20/00* (2013.01); *G07F 17/3206* (2013.01); *G07F 17/3209* (2013.01); *G07F 17/3211* (2013.01)

(58) Field of Classification Search
USPC ..................................... 463/30–33
See application file for complete search history.

(56) References Cited

U.S. PATENT DOCUMENTS

| | | | |
|---|---|---|---|
| 5,429,507 | A | 7/1995 | Kaplan |
| 6,243,078 | B1 | 6/2001 | Rosenberg |

(Continued)

FOREIGN PATENT DOCUMENTS

| | | |
|---|---|---|
| DE | 102007002933 | 7/2008 |
| DE | 102007019512 | 10/2008 |
| WO | 2007117418 | 10/2001 |

OTHER PUBLICATIONS

International Search Report for PCT/EP2013/064233, English translation attached to original, Both completed by the European Patent Office on Oct. 7, 2013, All together 7 Pages.

*Primary Examiner* — Ronald Laneau
(74) *Attorney, Agent, or Firm* — Brooks Kushman P.C.

(57) ABSTRACT

A gaming machine including housing in which a game sequence controller, at least one display device for displaying a gaming unit and at least one switching element, actuatable by a user and in contact with the game sequence controller, are arranged. At least one electromagnetic device coupled to the game sequence controller is associated with the switching element and, if the switching element is actuated, generates information that can be detected tactilely by the user in the form of a vibration and/or a change of the actuating resistance depending on the course of the game.

14 Claims, 5 Drawing Sheets

(56) References Cited

U.S. PATENT DOCUMENTS

| | | |
|---|---|---|
| 7,038,335 B2 | 5/2006 | Choi et al. |
| 8,346,309 B2 | 1/2013 | Han et al. |
| 8,764,546 B2 | 7/2014 | Graf et al. |
| 2002/0057152 A1 | 5/2002 | Elferich et al. |
| 2004/0038721 A1 | 2/2004 | Wells |
| 2004/0053671 A1 | 3/2004 | Nordman |
| 2004/0164971 A1 | 8/2004 | Hayward et al. |
| 2005/0036636 A1* | 2/2005 | Noro .................... B06B 1/0207 381/124 |
| 2005/0078815 A1 | 4/2005 | Saeki et al. |
| 2005/0101371 A1 | 5/2005 | Seelig et al. |
| 2005/0162105 A1* | 7/2005 | Yamasaki ............. B06B 1/0246 318/114 |
| 2007/0023540 A1 | 2/2007 | Selander |
| 2008/0132313 A1* | 6/2008 | Rasmussen ............. G07F 17/32 463/16 |
| 2008/0316171 A1 | 12/2008 | Shahoian et al. |
| 2009/0303175 A1 | 12/2009 | Koivunen |
| 2010/0160016 A1* | 6/2010 | Shimabukuro ..... G07F 17/3209 463/16 |
| 2010/0173686 A1 | 7/2010 | Grant et al. |
| 2010/0295820 A1 | 11/2010 | Kikin-Gil |
| 2011/0306416 A1 | 12/2011 | Kelly et al. |
| 2012/0105333 A1 | 5/2012 | Maschmeyer et al. |
| 2013/0274712 A1 | 10/2013 | Schecter |

\* cited by examiner

GAMING MACHINE

CROSS-REFERENCE TO RELATED APPLICATION

This application is the U.S. national phase of PCT Application No. PCT/EP2013/064233 filed on Jul. 5, 2013, which claims priority to DE Patent Application No. 10 2012 107 132.2 filed on Aug. 3, 2012, the disclosures of which are incorporated in their entirety by reference herein.

The invention relates to a gaming machine comprising a housing, in which are arranged a game sequence controller, at least one display device for displaying a gaming device, and at least one switching element which is actuatable by a user and which is connected to the game sequence controller.

Gaming machines used in the context of the invention are generally money-operated and known in a wide variety of embodiments. Such gaming machines often have one or more gaming devices. They most commonly comprise a symbol gaming device, in which symbol combinations indicating a win or loss are displayed by means of revolving bodies behind reading windows. The symbol gaming device can comprise cylinders and/or disks or can be displayed on a screen as required. In different levels cash wins and/or points wins and/or special game wins with an increased chance of winning compared with the normal game or the like are given or held out in prospect.

Money-operated gaming machines usually have at least one supplementary gaming device which consists of a plurality of win-specific display panels and in which a game result achieved in the symbol gaming device is gambled or accumulated. Such a supplementary win gaming device may be a risk gaming device, for example, in which a decision is taken about an increase or total loss of the winnings staked. Furthermore, in gaming machines it is known to increase or decrease the winnings obtained by means of a gambling device embodied as a supplementary gaming device. A further gaming incentive with an additional possibility of winning is a supplementary gaming device in the form of a jackpot gaming device, in which an additional win can be initiated.

All the gaming devices mentioned above have symbols which, in specific combinations represented on a win plan, for example, are associated with a win in the form of cash and/or points. Furthermore, particularly on modern visual display units, background images can be displayed and, moreover, the game event is accompanied by music or special sequences of sounds stored system-specifically in the gaming machine.

In one gaming machine known from the art, it is known to integrate switching means, for example for influencing a game sequence, for selecting or for starting a game or the like, either as touch-sensitive sensor panels into a screen of the gaming machine or to accommodate them as switches having mechanical switching elements in a housing of the gaming machine, preferably in an operating panel comprising a plurality of switches. It goes without saying that all the switching means are connected to a gaming machine controller. In order to encourage a player to actuate corresponding switches, for example depending on the course of the game, the switching means, preferably the operating elements thereof, in particular momentary contact switches, can be backlit, wherein the illumination elements are, of course, also activated or deactivated by means of the gaming machine controller. It is furthermore known in this connection to illuminate an actuated switching means in order to give the user of the gaming machine an indication of the switching state of the switching means. Accordingly, the user of the gaming machine always acquires visual perceptible information with regard to implemented or possible switching states of a switching means by virtue of the illumination thereof.

Furthermore, it is known to assign to the switching means latching devices, for example, which provide the user of the gaming machine with a haptically perceptible indication that the switching means has been rotated or pressed.

The information conveyed to the user is comparatively simple and is generally limited to the notification of whether or not a switching process took place.

DE 10 2007 002 933 A1 discloses an electronic gaming and/or betting machine comprising a display apparatus having a first and a second screen, on which a first screen display and a second screen display can be displayed, and an operating panel for actuating the gaming and/or betting machine. Provision is made of a changeover apparatus, which can be actuated by a user by means of an input device, for changing over the first screen display from the first screen to the second screen, and the second screen display from the second screen to the first screen, and/or vice versa. The input device can have an actuation key for actuating the changeover device by the pressing of a key, touch and/or proximity, wherein a vibration alert can be given to a game control key that is usually actuated by the user, said vibration alert being output upon the changeover of screen displays.

Furthermore, U.S. Pat. No. 5,429,507 A discloses a computer-controlled gaming machine for visually impaired or blind users, which uses updatable Braille pins to represent the symbols displayed by the gaming machine, wherein the Braille pins are moved vertically and independently of one another in each case by means of an electromagnet. Moreover, the indication for starting the gaming machine is given by a specific position of the Braille pins.

Furthermore, US 2010/016 0016 A1 describes a gaming machine comprising at least one operating element which, upon the occurrence of a particular game event, such as e.g. a change in the game rules, is caused to vibrate in order to give the user a corresponding indication. The operating element is connected to an electromagnetic coil that acts on an unbalanced mass in order to generate the vibration.

The invention is based on the object of providing a gaming machine of the type mentioned in the introduction which communicates with a user haptically or tactilely perceptibly via a user interface.

The object is achieved according to the invention by means of the features of claim 1.

The dependent claims present advantageous configurations of the invention.

A gaming machine comprises a housing, in which are arranged a game sequence controller, at least one display device for displaying a gaming device, and at least one switching element which is actuatable by a user and which is connected to the game sequence controller. The switching element is assigned at least one electromagnetic device which is coupled to the game sequence controller and which generates, upon an actuation of the switching element, information that can be detected tactilely by a user in the form of a vibration and/or a change of an actuation resistance depending on the course of the game.

According to one development, the device generates, upon an actuation of the switching element, information that can be detected tactilely by a user in the form of a change of position and/or change of shape.

Besides the possibilities known heretofore from the prior art for conveying to the user of the gaming machine visually and/or acoustically or tactilely perceptible information concerning the gaming machine, according to the invention it is also possible, when the switching element is engaged and/or actuated, to provide information dependent on the course of the game for the user, for example a vibration, a variable actuation resistance or the like, wherein the electromagnetic device which is embodied in particular as a vibration device, a brake, a motor or the like, communicates with the game sequence controller, which, at any time at which the gaming machine is active, irrespective of whether or not a game is in progress, can bring about a corresponding tactilely or haptically detectable action of the switching element by virtue of the electromagnetic device being driven. Since the electromagnetic device can be driven depending on the course of the game, the user acquires tactilely detectable information, without having to avert his/her gaze from the actual game event. It goes without saying that it is possible to provide the different items of tactile information not only separately, but also in combination. By way of example, a touch-sensitive film of the display device representing a switching element, or a flexible actuation element of the switching element can both be altered in shape by elevations/depressions being produced, and be caused to oscillate by a vibrator. This type of information can be supported by an acoustically perceptible noise, for example a humming sound or whistle, which is output at the same time as the driving of the electromagnetic device by a loudspeaker that is present anyway on the gaming machine.

Preferably, the switching element is embodied as a touch-sensitive sensor panel of a touchscreen, as a rotary switch, a pressure switch, a pull switch or a pushbutton switch or as a combination of said switches. It goes without saying that all required sensors and actuators can also be assigned to the switching element besides corresponding microcontrollers in order to form a compact structural unit. The touchscreen can comprise a glass plate which is electrically conductive in a known manner, or a film-like OLED display.

In one configuration, the intensity of the vibration is variable. The corresponding control is carried out in a computer-controlled manner on the part of the game sequence controller. It goes without saying that the vibration can be used in association with any arbitrary switching element, for example also with a sensor panel of a touchscreen, in order to sensitize the user for a game situation.

Expediently, the switching element or an actuation element and/or the sensor panel are/is mounted and/or embodied in an oscillating fashion. By way of example, the touchscreen can be arranged with intermediate arrangement of elastic elements in the housing or a frame assigned to the housing, and at least one vibrator coupled to the game sequence controller is arranged on that side of the touchscreen which faces away from the user. It is also possible for the cross section of the touchscreen in the region of the sensor panel to be weakened in a targeted manner compared with the rest of the cross section and for this thinner region to be caused to oscillate. A switching element or actuation element of a switch can be mounted with play or at least regionally can be embodied in an elastic fashion or mounted in a flexible fashion, in order that it can be caused to vibrate in a manner perceptible to the user.

According to one development, the vibration-generating electromagnetic device comprises a permanent magnet and an excitable coil, wherein one part of the device is arranged in a housing-fixed manner and the other part is arranged movably relative thereto on the component to be caused to vibrate. By way of example, the permanent magnet can be adhesively bonded to the touchscreen.

In one configuration, the electromagnetic device brings about an alteration of the position of an actuation element of the switching element. In a manner driven by the game sequence controller, the actuation element of the switching element can be rotated or displaced in an arbitrary or requirement-dependent direction in order either to induce the user of the gaming machine to carry out a desirable action in a specific game situation or, upon the actuation of the actuation element, to generate a force opposite to the actuation direction. The alteration of the position of the actuation element brought about by the game sequence controller by means of the electromagnetic device can also be carried out for the instruction of a user outside the actual game, for example in intermissions or in a demonstration mode.

Expediently, an actuation direction and/or position of the actuation element can be detected by means of the electromagnetic device. For this purpose, for example, Hall sensors can be provided or an electrical change in the electromagnetic device, for example a stepper motor or an electromagnetic coil, is correspondingly detected and evaluated, in which case the data can be detected and evaluated for example on the part of the game sequence controller or a separate computer module.

The electromagnetic device is expediently embodied as a brake or a stepper motor and brings about an increasing or decreasing resistance to an actuation of the switching element. The device embodied as a brake or motor can act for example on a switching spindle of the switching element the in order to counteract the actuation direction. It goes without saying that it can also influence an actuation rocker of a rocker switch on the carrier shaft journals thereof in the pivoting movement. Furthermore, it is possible to move the actuation element by means of the stepper motor both in a supporting manner and automatically. If the actuation of the switching element is monitored by means of a sensor, the data of which are present in an evaluatable manner, for example at the game sequence controller, the switching position can also be processed as additional information and reported back to the user in a tactilely detectable manner. In particular, it is possible, in the case of a gaming machine embodied as cash-win gaming machine, to generate an increasing or decreasing resistance to an actuation of the switching element if there is a risk of winning or risk of loss, in order also to make the user aware of a particular game situation by means of a palpable perception.

Preferably, the actuation element of the switching element is produced at least regionally from an elastic material, preferably a silicone, and the electromagnetic device is embodied in such a way that it alters the shape of the actuation element. If corresponding actuators are assigned to the electromagnetic device, the actuation element can be, for example, depending on the game event, e.g. triangular, rectangular, round, spherical or the like in order to make the user aware of a change in the game by means of the change of shape. Equally, the shape of the actuation element embodied as a flexible touchscreen can be altered by elevated and/or trough-like recessed regions being created, for example, if an armature which is coupled to a coil and bears on or is fixed to the surface to be moved is moved.

In order also to provide visually perceptible information for the user directly at the switching element, drivable illumination means are assigned to the switching element. By way of example, so-called RGB light emitting diodes can be provided, which, coupled directly or indirectly to the game sequence controller, change their color depending on the course of the game or the like.

Further information can be communicated to the user in the form of heat. For this purpose, expediently, at least one thermoelement which is controllable by the game sequence controller is assigned to the switching element. The thermoelement, via the switching means or the actuation element thereof, can locally emit heat which is perceptible to the user when acting on the actuation element. If the actuation element is part of a sliding controller or a corresponding sensor panel, for example, then the temperature can increase with a sliding movement proceeding from a starting position.

In order furthermore to bring the game event palpably nearer to the user, an electrical pump apparatus for discharging a spray from a supply container is arranged within the housing, said electrical pump apparatus being drivable by the game sequence controller. Depending on the game event, with a particular fragrance, the user can obtain a kind of reward and thus additional information.

Furthermore, as an alternative or in addition to the devices mentioned above, an electrical fan drivable by the game sequence controller is arranged in the housing behind ventilation slots in such a way that an air flow can be generated in the direction of the user. Speed-conveying information can be relayed to the user by the air flow.

It goes without saying that the features mentioned above and those yet to be explained below can be used not only in the combination respectively indicated, but also in other combinations. The scope of the invention is defined only by the claims.

The invention is explained in greater detail below on the basis of a plurality of exemplary embodiments with reference to the associated drawing, in which.

Figure 1:
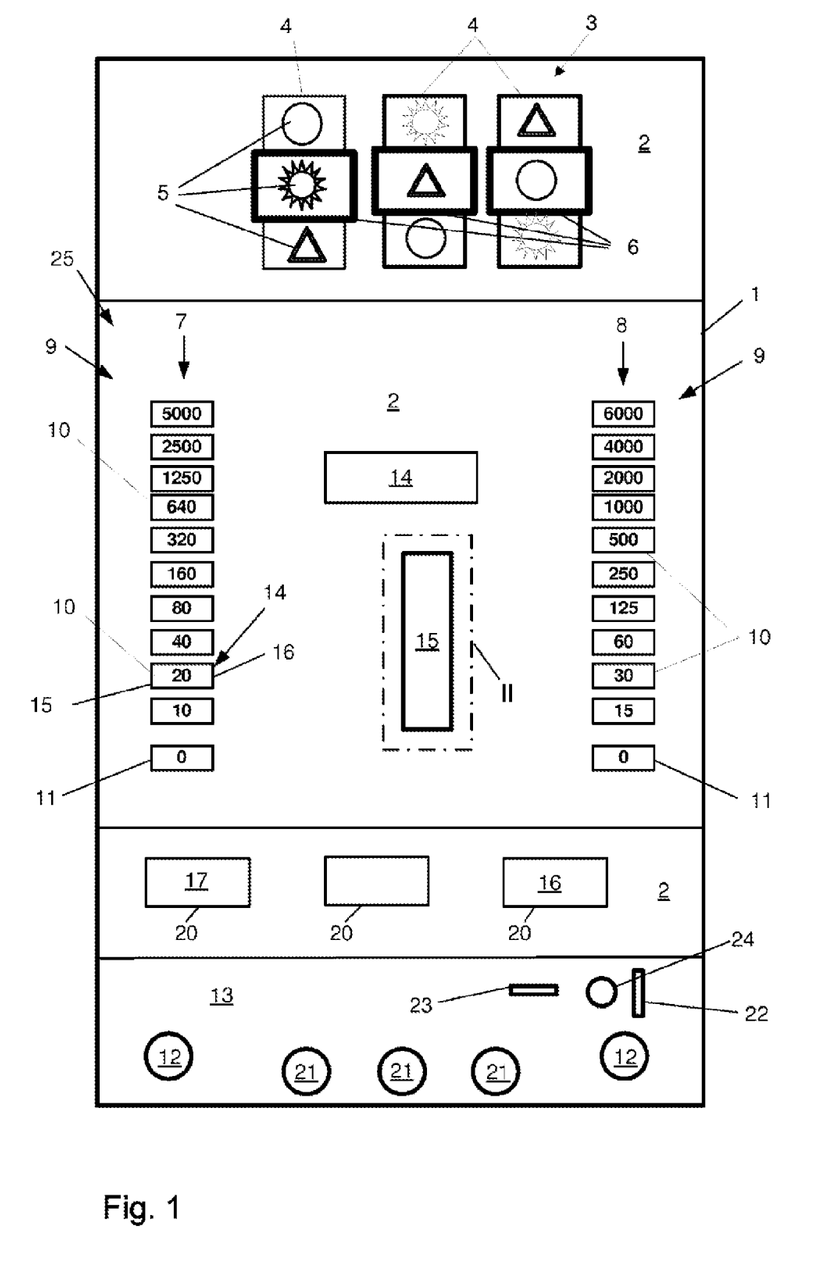
FIG. 1 shows a schematic illustration of a front view of a gaming machine according to the invention.

The front of the housing 1 of the money-operated, computer-controlled gaming machine with a win opportunity has three screens 2 arranged one above another, the top screen 2 of which is used to present a gaming device 3 that is visually presented in the form of a symbol gaming device with three revolving bodies 4 in cylindrical form that are arranged next to one another. In a computer-controlled manner, a game sequence controller generates an image corresponding to rotating revolving bodies 4 with circumferential symbols 5. Furthermore, in a computer-controlled manner, reading windows 6 are presented on the screen 2, which are used to display a randomly controlled game result, that is to say a specific combination of symbols 5. The presentation of the game result is accompanied by a display of the virtual revolving bodies 4 that corresponds to stopped cylinders. From the displayed symbols 5, the user can read off the game result, in particular also whether there is a win according to a displayable win plan.

The screen 2 in the middle of the gaming machine is embodied as a touchscreen 25 and is used to present supplementary gaming devices 9 embodied as risk ladders 7, 8. The winnings attained in the gaming device 3 by achieving a symbol combination determined in a randomly controlled manner can be transferred under key or computer control as a stake to one of the supplementary gaming devices 9 arranged on both sides of the central screen 2. The left-hand risk ladder 7 comprises a plurality of display panels 10 presented one above another, which are allocated winnings values from 10 to 5 000 points in ascending order. The right-hand risk ladder 7 likewise has a plurality of display panels 10 presented one above another, which are allocated winnings values from 15 to 6000 points in ascending order.

The winnings displayed in the risk ladder 7 or 8 are gambled by virtue of the fact that the next higher display panel 10 in relation to the visually highlighted display panel 10 that displays the winnings is presented so as to flash alternately with a total loss display panel 11 labeled "0" that is placed below the risk ladder 7 or 8. When a key 12 embodied as a momentary contact switch is actuated, said key being arranged in a lower housing section 13, either the next higher winnings are attained or the staked winnings are lost, under random control. This process can be continued until the presented maximum winnings in terms of points are reached.

Between the two risk ladders 7, 8, a jackpot display 14 is provided, which is part of a jackpot device known to the person skilled in the art and serves for displaying points that are obtained depending on a game result achieved. Furthermore, a sensor panel 15 is implemented, which is coupled to the game sequence controller and initiates a switching process when a user brushes over it.

The bottom screen 2 is provided with displays 20 for credits, points, winnings and the like, with one of the displays 20 representing a points bank 16. When there is a credit in a display 20 as embodied as a credit display 17, a specific sum of money from the credit display 17 is converted into a specific number of points and added to the points bank 16, from which a specific number of points are debited as a stake for a game in the gaming device 3 and to which points won in the gaming device 3 are added. When a cash value is paid out, the points value in the points bank 16 is first of all converted into a credit in a prescribed time interval, which credit is to be presented in the credit display 17.

Restart/stop keys embodied as momentary contact switches 21 are arranged in the lower housing section 13 of the gaming machine. When said keys are acted on, that symbol 5 of the assigned revolving body 4 which is displayed in the gaming device 3 can be restarted or prematurely stopped, i.e. the display is influenced in such a way that the revolving bodies 4 appear in a stationary or rotating form. Furthermore, a coin insertion slot 22 and a bank note feed slot 23 of a cash processing device (not illustrated in more specific detail) are provided. Moreover, a return key 24 is arranged next to the coin insertion slot 22, and actuation of said return key enables a credit displayed in the credit display 20 to be withdrawn to a dispensing tray (not illustrated).

The key 12 and/or the momentary contact switch 21 and/or the sensor panel 15 or the complete touchscreen 25 are/is embodied in each case as a switching element 26 to which an electromagnetic device 27 is assigned.

The electromagnetic device 27 is embodied as a brake, for example, which varies a force required for acting on the respective actuation element 28 or, as vibration device 29 enables a corresponding haptic/tactile perceptibility of the switching process by a user.

Figure 2:
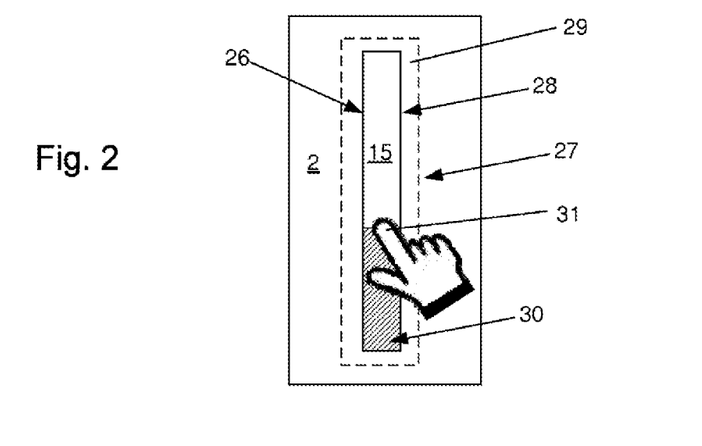
FIG. 2 shows a schematic illustration of a switching element in accordance with a detail II according to FIG. 1.

As shown in FIG. 2, the switching element 26 is assigned drivable illumination means 30 for presenting a kind of bar display. If the user brushes over the elongate sensor panel 15 of the switching element 26 with his/her finger 31 for a game-dependent input, then said user acquires feedback about his/her action by means of the bar display, the position of which varies, and/or a possible change in color of the illumination means 30 assigned to the bar display, and a vibration generated by the vibration device 29 and perceived by the user with his/her finger 31 resting on the screen 2.

Figure 3:
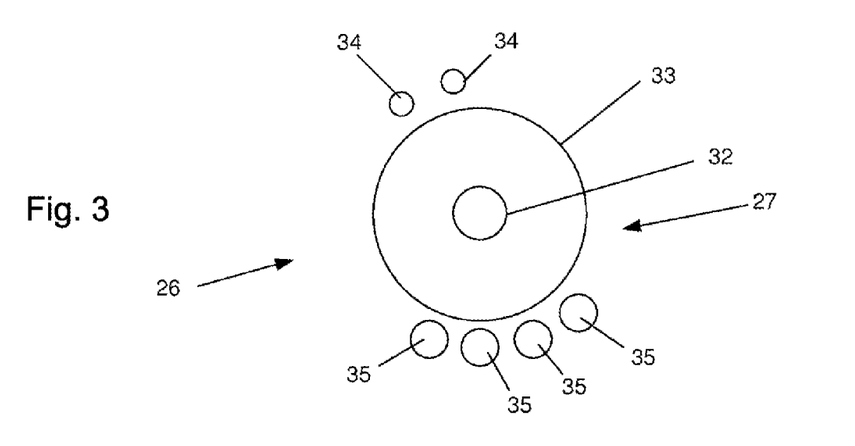
FIG. 3 shows a schematic partial illustration of the switching element in an alternative configuration.

For detecting a rotation direction or a change of rotation direction or for generating a rotary movement, the electromagnetic device 27 of the switching element 26 embodied as a rotary switch according to FIG. 3 comprises a permanent magnet 32 in the center of an iron disk 33 provided with an outer toothing, wherein the permanent magnet and the iron disk 33, which can also be embodied as a toothed shaft, are part of a switching spindle which is coupled to an actuation element of the switching element 26 and which can interact with switching contacts. The peripheral circumference of the iron disk 33 is assigned two Hall sensors 34 spaced apart from one another, which are connected to a microcontroller (not illustrated) of the switching element 26 and furthermore to the superordinate game sequence controller of the gaming machine. Furthermore, the outer circumference of the iron disk 33 is assigned a plurality of electromagnetic excitation units 35 for generating a traveling magnetic field, which are likewise coupled to the microcontroller. An identification of the rotation direction is possible on the basis of the signals from the Hall sensors 34, after a corresponding signal evaluation. The traveling magnetic field generated by the excitation units 35 brings about a rotation of the iron disk 33 and of the actuation element connected thereto, as a result of which at least one corresponding switching process is initiated.

Figure 4:
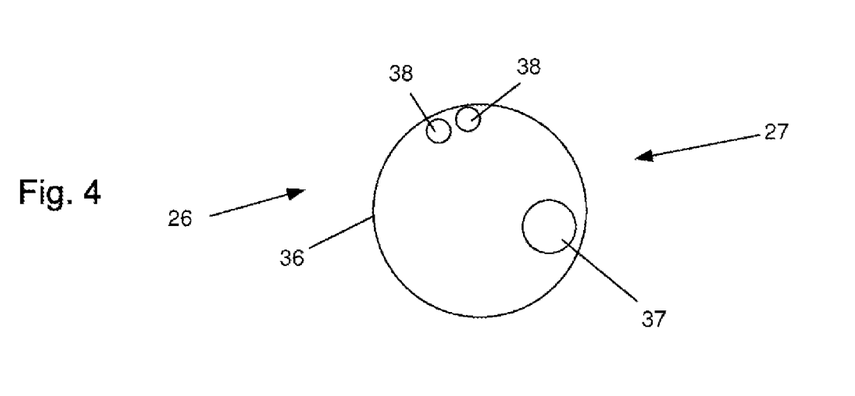
FIG. 4 shows a schematic partial illustration of the switching element in a further alternative configuration.

In accordance with FIG. 4, the electromagnetic device of the switching element 26 embodied as a rotary switch for detecting a rotation direction or a change of rotation direction or for generating a rotary movement is substantially composed of a rotary body 36 having an inner toothing, a motor 37 that interacts with the inner toothing, and sensors 38 that detect the toothing, wherein, of course, all the components mentioned above can be accommodated jointly with a microcontroller for signal evaluation and control in a switch housing. The sensors 38 assigned to the inner toothing detect a change of rotation angle of the rotary body 36 and thus of the actuation element of the switching element 26, said actuation element being connected to the rotary body 36, from which it is possible to determine a position or change in position of the rotary body 36 around a switching spindle. The motor 37 can firstly drive the rotary body 36 in order to implement a switching process, or it supplies information regarding the rotary movement as a result of the current generated on account of a rotation of the rotary body 36 or of the actuation element of the switching element.

Figure 5:
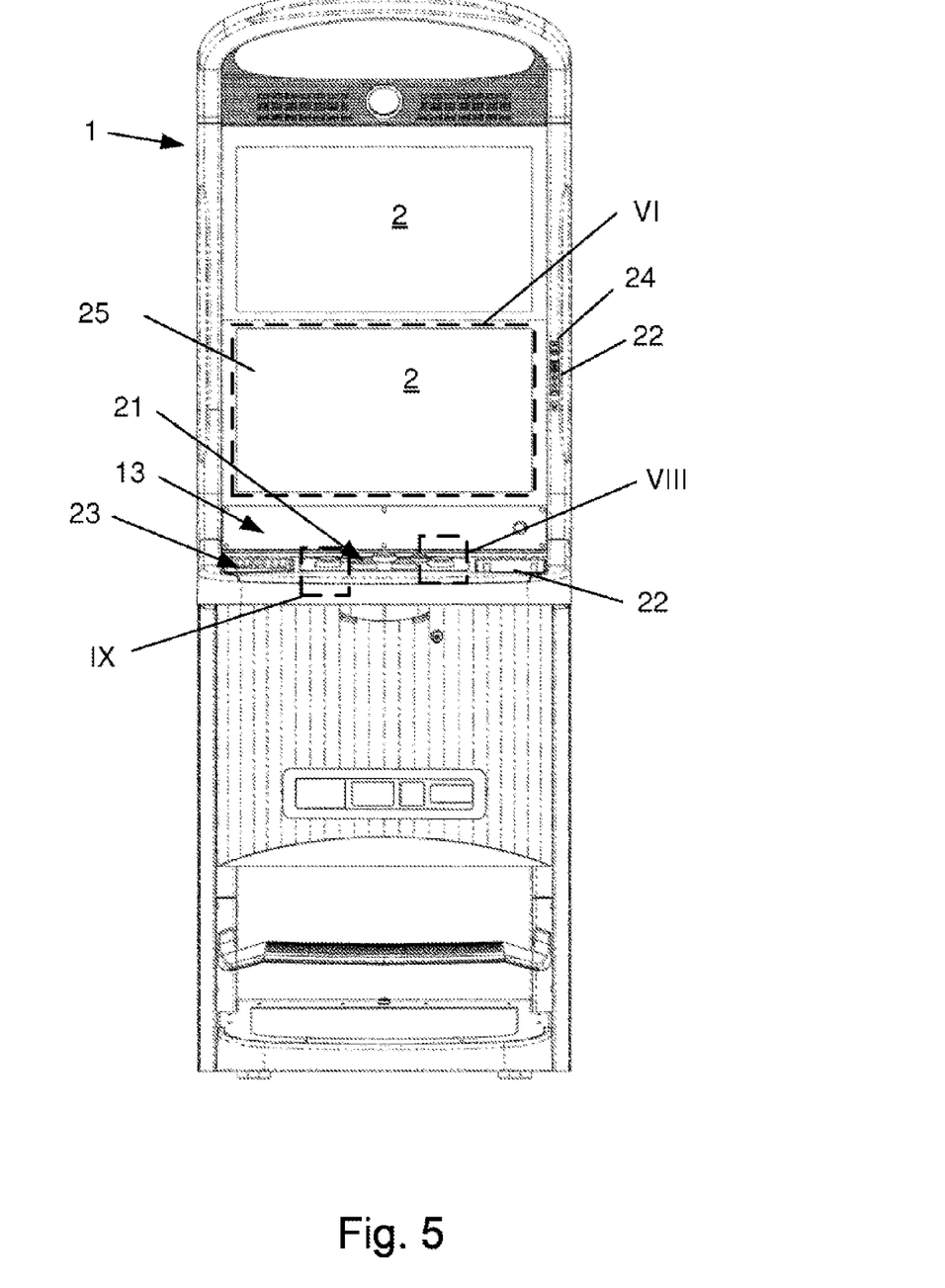
FIG. 5 shows a front view of an alternative gaming machine according to the invention.

In an alternative configuration in accordance with FIG. 5, the housing 1 of the money-operated, computer-controlled gaming machine comprises two screens 2 arranged one above the other as display devices 49, of which the top screen 2 is used to present game-related information and the bottom screen is used to present a gaming device. Inter alia, momentary contact switches 21 and further switching elements 26 are arranged in the housing section 13 below the bottom screen 2, which is embodied as a touchscreen 25.

Figures 6, 8:
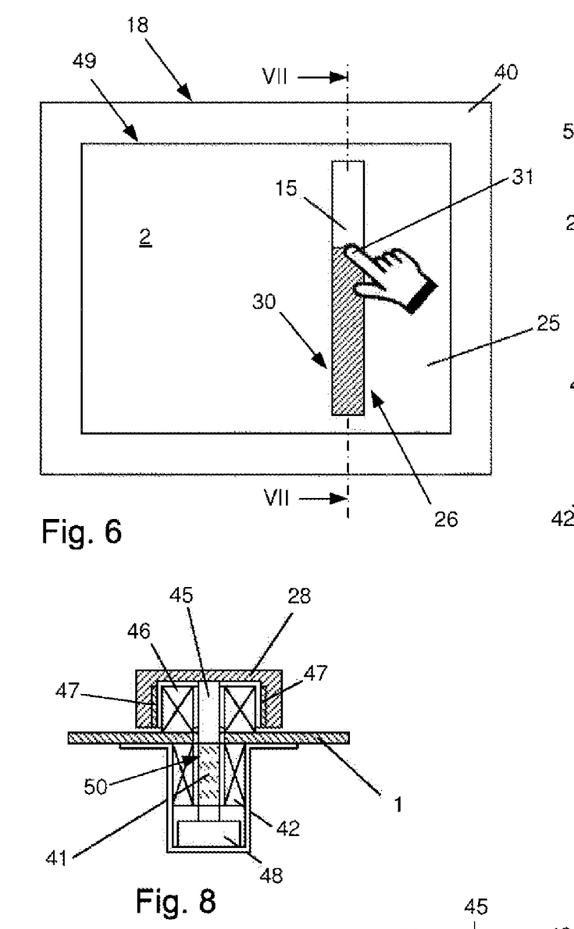
FIG. 6 shows a schematic illustration of a switching element in accordance with a detail VI according to FIG. 5.
FIG. 8 shows a schematic illustration of a switching element in accordance with a detail VIII according to FIG. 5.
Figure 7:
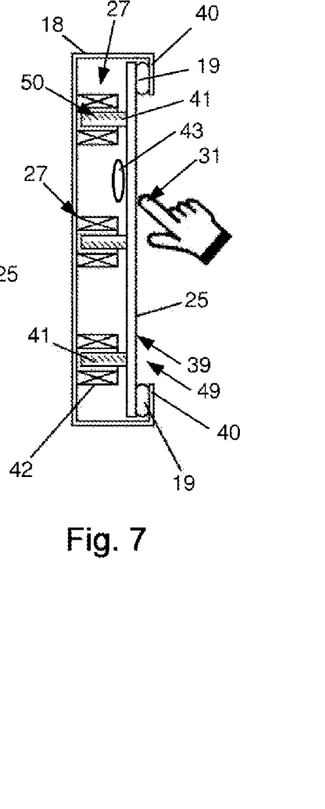
FIG. 7 shows a sectional illustration in accordance with the line VII-VII according to FIG. 6.

In accordance with FIG. 6 and FIG. 7, the touchscreen 25 is mounted resiliently in a housing-fixed circumferential frame 18, wherein an elastic material 19, for example an elastomeric plastic, preferably a silicone, is arranged between a conductively coated front plate 39 of the touchscreen 25, said front plate consisting of glass, for example, and a frame limb 40 engaging over the front plate 39 marginally. On that side of the front plate 39 which faces away from the user, in a manner distributed over the elongate sensor panel 15 of the switching element a plurality of magnetic bars 41—comprising permanent magnets 50—of the electromagnetic device 27 embodied as vibration device 29 are fixed at the end side, by means of adhesive bonding for example, and extend into electromagnetic coils 42, which are coupled to the game sequence controller for driving purposes. On account of the distribution of the vibration devices 29, which can also be installed in combination with the illumination means 30 for the purpose of visually presenting the bar display, if appropriate with a color change, and on account of the different intensities and/or frequencies with which oscillations are generated by the excitation of the coils 42, the user acquires feedback about his/her action with his/her finger 31 resting on the screen 2.

The travel of the magnetic bars 41 relative to the assigned coils 42 of the vibration devices can be approximately 0.05 mm to 0.2 mm, the coils 42 being connected in series and driven by MOSFET transistor output stages with an energy demand of approximately 1 W. The reaction time of the vibration device 29 is approximately 20 ms. At any rate the electromagnetic field is so weak that no significant disturbances or impairments are brought about, particularly with regard to pacemakers, hearing aids or the like.

The vibration device 29 can also comprise a motor having an imbalance, and the touchscreen 25 can consist of a film that is connected directly to the vibration device 29. The vibration device 29 can also bring about a regional oscillation of the touchscreen 25, by virtue of a targeted arrangement of the vibration devices 29 in the region of the respective switching element 26 or a weakening of the cross section of the front plate 39. In order to generate a temperature stimulus, the arrangement of a thermoelement 43 is also possible, said thermoelement changing its temperature under game sequence control.

The switching element 26 according to FIG. 8 is embodied as a rotary/pressure switch 44, the central spindle 45 of which is embodied at least in sections as a magnetic bar 41 and is arranged both rotatably and axially displaceably in the housing-fixed coil 42. A vibration of the actuation element 28 can be generated by the interaction of the coil 42 with the magnetic bar 41. Within the pot-shaped actuation element 28 a stepper motor 46 is arranged in a manner fixed to the housing, said stepper motor interacting with magnet poles 47 in the interior of the actuation element 28 in order compulsorily to rotate the actuation element 28 and thus the switching element 26 and to generate in this way a higher or lower resistance to a rotary movement by the user. A rotary position of the actuation element 28 can be derived from the position of the stepper motor 46 on a corresponding evaluation of the terminal voltage thereof during the rotation by means of an evaluation unit, which can be integrated into the game sequence controller. Alternatively, it is possible to arrange a position sensor 48 at the spindle 45 of the actuation element 28, wherein the position sensor 48 can comprise a pressure switching element.

Figure 9:
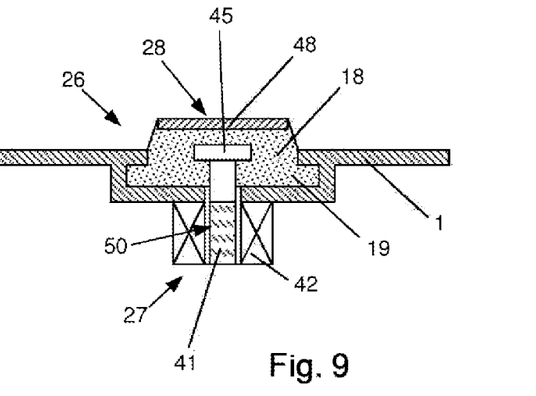
FIG. 9 shows a schematic illustration of a switching element in accordance with a detail IX according to FIG. 5.

According to FIG. 9, the actuation element 28 is produced from the elastic material 19 at least regionally, wherein an actuation plate 48 produced from a relatively rigid material, also as a decorative element, can be provided. The magnetic bar 41 that engages into the coil 42 is embedded into the elastic material 18. The actuation element 28 is mounted marginally, wherein contacts that are not illustrated in more specific detail are arranged circumferentially and in an axial direction in order that the rotary/pressure switch 44 is realized. A vibration can be generated by means of high-frequency driving of the coil 42. Alternatively, it is also possible to displace the magnetic bar 41 for compressing and thus changing the shape of the actuation element 28 in the region of the elastic material 19.

Figure 10:
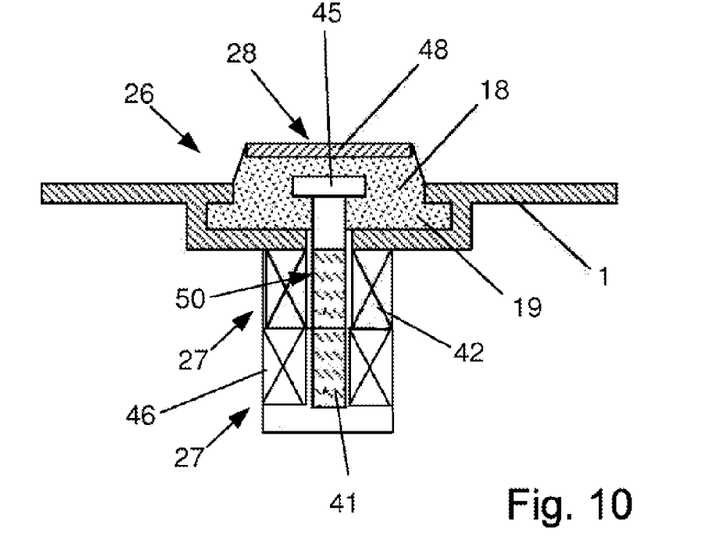
FIG. 10 shows a schematic illustration of the switching element in accordance with FIG. 9 in an alternative configuration.

In accordance with FIG. 10, the actuation element 28 explained above is additionally provided with the stepper motor 46, which is arranged on the one hand in a manner fixed to the housing and on the other hand in a manner interacting with the spindle 45 in order to rotate the actuation element 28, that is to say alter the position thereof, or to increase the resistance during rotation, by virtue of the fact that said motor counteracts the rotation, or to reduce the resistance that can be felt, by virtue of the fact that said motor has a supporting action.

Figure 11:
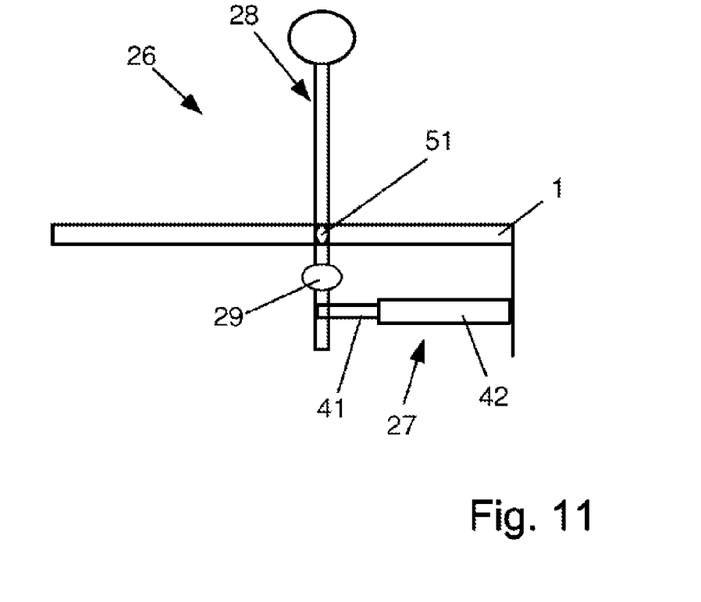
FIG. 11 shows a schematic illustration of an alternatively configured switching element.

The switching element 26 according to FIG. 11 comprises the lever-type actuation element 28, which is pivotable in a pivoting bearing 51 in the housing 1 and interacts with the switching contacts (not illustrated). The electromagnetic device 27 acts on the actuation element 28, and increases or decreases the pivoting resistance of the actuation element 28 or displaces the actuation element 28 in one direction or the other, if the coil 42 is correspondingly energized and the magnetic bar 41, which at one end extends into the coil 42 and at the other end is coupled to the actuation element 28, is displaced. The vibration device 29 comprising a motor having an imbalance is arranged on the actuation element 28, which is mounted with play, said vibration device causing the actuation element 28 to oscillate.

It goes without saying that corresponding switching contacts are assigned to the switching element 26, and the electromagnetic device is connected both to a voltage source and to the gaming machine controller by means of corresponding electrical conductors which are not illustrated for reasons of clarity.

List of reference signs

| | |
|---|---|
| 1. | Housing |
| 2. | Screen |
| 3. | Gaming device |
| 4. | Revolving body |
| 5. | Symbol |
| 6. | Reading window |
| 7. | Risk ladder |
| 8. | Risk ladder |
| 9. | Supplementary gaming device |
| 10. | Display panel |
| 11. | Total loss display panel |
| 12. | Key |
| 13. | Housing section |
| 14. | Jackpot display |
| 15. | Sensor panel |
| 16. | Points bank |
| 17. | Credit display |
| 18. | Frame |

-continued

List of reference signs

| | |
|---|---|
| 19. | Material |
| 20. | Display |
| 21. | Momentary contact switch |
| 22. | Coin insertion slot |
| 23. | Bank note feed slot |
| 24. | Return key |
| 25. | Touchscreen |
| 26. | Switching element |
| 27. | Device |
| 28. | Actuation element |
| 29. | Vibration device |
| 30. | Illumination means |
| 31. | Finger |
| 32. | Permanent magnet |
| 33. | Iron disk |
| 34. | Hall sensor |
| 35. | Excitation unit |
| 36. | Rotary body |
| 37. | Motor |
| 38. | Sensor |
| 39. | Front plate |
| 40. | Frame limb |
| 41. | Magnetic bar |
| 42. | Coil |
| 43. | Thermoelement |
| 44. | Rotary/pressure switch |
| 45. | Spindle |
| 46. | Stepper motor |
| 47. | Magnet pole |
| 48. | Actuation plate |
| 49. | Display device |
| 50. | Permanent magnet |
| 51. | Pivoting bearing |

The invention claimed is:

1. A gaming machine comprising a housing, in which are arranged a game sequence controller, at least one display device for displaying a gaming device, and at least one switching element which is actuatable by a user and which is connected to the game sequence controller, wherein the switching element is assigned at least one electromagnetic device which is coupled to the game sequence controller and which comprises a permanent magnet and an excitable coil and which generates, upon an actuation of the switching element, information that can be detected tactilely by a user in the form of a vibration depending on the course of the game, wherein the switching element is embodied as a touch-sensitive sensor panel of a touchscreen, wherein the switching element and/or the sensor panel are/is mounted and/or embodied in an oscillating fashion, one part of the electromagnetic device is arranged in a housing-fixed manner and the other part is arranged movably relative thereto on the switching element to be caused to vibrate, wherein the touchscreen comprising a conductively coated front plate is resiliently mounted in a housing-fixed circumferential frame and, on that side of the front plate which faces away from a user, a plurality of permanent magnets of the electromagnetic device, said permanent magnets extending into excitable electromagnetic coils, are fixed at the end side.

2. The gaming machine as claimed in claim 1, wherein the intensity of the vibration is variable.

3. The gaming machine as claimed in claim 1, wherein an actuation direction and/or position of the actuation element can be detected by means of the electromagnetic device.

4. The gaming machine as claimed in claim 1, wherein drivable illumination means are assigned to the switching element.

5. A gaming machine comprising a housing, in which are arranged a game sequence controller, at least one display device for displaying a gaming device, and at least one switching element which is actuatable by a user and which is connected to the game sequence controller, wherein the switching element is assigned at least one electromagnetic device which is coupled to the game sequence controller and which comprises a permanent magnet and an excitable coil and which generates, upon an actuation of the switching element, information that can be detected tactilely by a user in the form of a vibration depending on the course of the game, wherein the switching element is embodied as a rotary/pressure switch or as a combination of these switches, wherein the switching element or an actuation element are/is mounted and/or embodied in an oscillating fashion, one part of the electromagnetic device is arranged in a housing-fixed manner and the other part is arranged movably relative thereto on the switching element to be caused to vibrate, wherein a central spindle of the rotary/pressure switch is embodied at least in sections as a magnetic bar and is arranged both rotatably and axially displaceably in the excitable coil, which is arranged in a manner fixed to the housing, wherein a vibration of the actuation element can be generated by the interaction of the excitable coil with the magnetic bar.

6. The gaming machine as claimed in claim 5, wherein the intensity of the vibration is variable.

7. The gaming machine as claimed in claim 5, wherein an actuation direction and/or position of the actuation element can be detected by means of the electromagnetic device.

8. The gaming machine as claimed in claim 5, wherein drivable illumination means are assigned to the switching element.

9. The gaming machine as claimed in claim 2, wherein an actuation direction and/or position of the actuation element can be detected by means of the electromagnetic device.

10. The gaming machine as claimed in claim 2, wherein drivable illumination means are assigned to the switching element.

11. The gaming machine as claimed in claim 3, wherein drivable illumination means are assigned to the switching element.

12. The gaming machine as claimed in claim 6, wherein an actuation direction and/or position of the actuation element can be detected by means of the electromagnetic device.

13. The gaming machine as claimed in claim 6, wherein drivable illumination means are assigned to the switching element.

14. The gaming machine as claimed in claim 7, wherein drivable illumination means are assigned to the switching element.

* * * * *